(12) United States Patent
Davis et al.

(10) Patent No.: US 11,119,896 B1
(45) Date of Patent: Sep. 14, 2021

(54) BROWSER BASED VISUAL DEBUGGING

(71) Applicant: MICROSOFT TECHNOLOGY LICENSING, LLC, Redmond, WA (US)

(72) Inventors: Joseph Michael Davis, Sammamish, WA (US); Ahmed M. Metwally, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/863,979

(22) Filed: Apr. 30, 2020

(51) Int. Cl.
| | |
|---|---|
| *H04L 29/08* | (2006.01) |
| *H04L 29/06* | (2006.01) |
| *G06F 15/16* | (2006.01) |
| *G06F 11/36* | (2006.01) |
| *G06F 11/14* | (2006.01) |
| *G06F 16/958* | (2019.01) |
| *G06F 40/117* | (2020.01) |
| *G06F 16/11* | (2019.01) |
| *G06F 8/33* | (2018.01) |

(52) U.S. Cl.
CPC ............ *G06F 11/3664* (2013.01); *G06F 8/33* (2013.01); *G06F 16/128* (2019.01); *G06F 16/986* (2019.01); *G06F 40/117* (2020.01)

(58) Field of Classification Search
CPC ..... H04L 67/02; H04L 69/329; G06F 16/958; G06F 16/9574; G06F 11/128; G06F 11/986; G06F 8/33; G06F 8/75
See application file for complete search history.

(56) References Cited

U.S. PATENT DOCUMENTS

| | | | |
|---|---|---|---|
| 9,785,637 B2 * | 10/2017 | Ayyar | ...................... G06F 16/11 |
| 2012/0331375 A1 | 12/2012 | Fanning et al. | |
| 2016/0062963 A1 | 3/2016 | Umapathy | |

OTHER PUBLICATIONS

Hodovan et al., Tree Preprocessing and Test Outcome Caching for Efficient Hierarchical Delta Debugging, 7 pages (Year: 2017).*
"International Search Report and Written Opinion Issued in PCT Application No. PCT/US2021/025697", dated Jun. 22, 2021, 16 Pages.

* cited by examiner

*Primary Examiner* — Thuy Dao
(74) *Attorney, Agent, or Firm* — Ogilvie Law Firm (57) ABSTRACT

A web browser, editor, and server cooperate to enable visual debugging of hypertext markup language (HTML) code. The editor loads an HTML source file and displays it for interactive editing. The web server generates a web page from the source file and at the same time generates a page representation that is provided to the editor. The browser receives the web page from the web server and generates a document object model (DOM) to display a view of the HTML page. The editor takes snapshots of the HTML source file in correspondence with edits thereto. The snapshots are compared to find a snapshot difference, which is correlated with the page representation. The page representation is updated by the editor. Based on the updated page representation, the editor communicates with the browser to update the DOM. The updated DOM is rendered by the browser without reloading the web page.

20 Claims, 11 Drawing Sheets

WEB CONTROL DESIGN-TIME HTML

```
<asp:GridView runat="server" DataSourceID="MyData" />
```

160B

```
<table>
    <tr><th>Col1</th><th>Col2</th><th>Col3</th></tr>
    <tr><td>Databound</td><td>Databound</td><td>Databound</td></tr>
    <tr><td>Databound</td><td>Databound</td><td>Databound</td></tr>
    <tr><td>Databound</td><td>Databound</td><td>Databound</td></tr>
</table>
```

PREVIEW/MODIFIED VERSION

BROWSER BASED VISUAL DEBUGGING

BACKGROUND

Development of web pages often involves editing files that contain a blend of static hypertext markup language (HTML) code and executable code such as JavaScript code, Razor code, or other types code that may be executed or translated by a web server or a web browser to add HTML code to the resulting web page. When web source files contain non-HTML code there is usually a disconnect between the code in a source file and the content that is ultimately displayed by the browser. When a web server renders a source file the web server may execute or translate non-HTML code in the source file that adds HTML content, modifies HTML content in the file, etc. Similarly, when a browser receives an HTML page from a web server, the browser may execute code such as JavaScript, which may modify the document object model (DOM) generated by the browser to display the HTML page. In short, at any time between when (i) a web server renders a source file into an HTML page and when (ii) a browser renders the HTML page for display, operations, by executable content or otherwise, may modify the displayed page that in ways that are difficult or impossible to predict based on only the source file itself.

This dynamic disconnect between a source file and a page rendered by a browser can make it difficult to allow displaying of both the source file (e.g. in an editor) and the page (in the browser) while maintaining consistency between the two. If the source file contains only static HTML code then it is not difficult to map editor operations on the source file to corresponding changes in the browser's rendered page. It is also not difficult to map user interactions or edits in the browser's displayed page to corresponding operations in an editor displaying the source file. However, when the rendered page contains dynamic server-generated content, mapping between an editor and the browser may require complex and difficult-to-maintain code. There is a need to maintain consistency between an editor view of a source file and a rendered page of the source file in ways that are adaptable and that do not require extensive knowledge of how the dynamic content is generated or the mechanisms that cause the rendered page to differ from the source file.

SUMMARY

The following summary is included only to introduce some concepts discussed in the Detailed Description below. This summary is not comprehensive and is not intended to delineate the scope of the claimed subject matter, which is set forth by the claims presented at the end.

A web browser, editor, and server cooperate to enable visual debugging of hypertext markup language (HTML) code. The editor loads an HTML source file and displays it for interactive editing. The web server generates a web page from the source file and at the same time generates a page representation that is provided to the editor. The browser receives the web page from the web server and generates a document object model (DOM) to display a view of the HTML page. The editor takes snapshots of the HTML source file in correspondence with edits thereto. The snapshots are compared to find a snapshot difference, which is correlated with the page representation. The page representation is updated by the editor. Based on the updated page representation, the editor communicates with the browser to update the DOM. The updated DOM is rendered by the browser without reloading the web page.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

DETAILED DESCRIPTION

Figure 1:
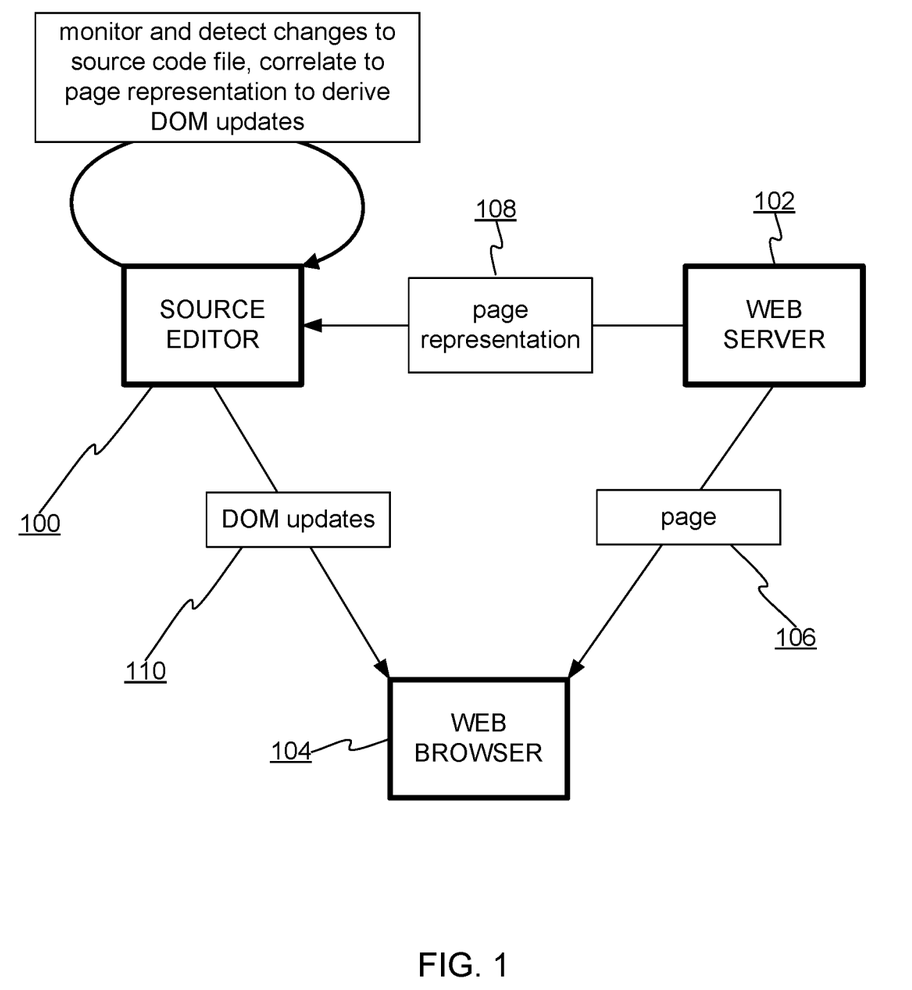
FIG. 1 shows how an editor, web server, and web browser may share information to maintain synchronization between a page displayed by the web browser and a view of a source file displayed by the editor.

FIG. 1 shows how an editor 100, web server 102, and web browser 104 may share information to maintain synchronization between a page 106 displayed by the web browser and a view of a source file displayed by the editor 100. In the ordinary workflow of developing a web page, the editor 100 may edit a source file. Whether through a development or production environment, the browser 104 requests a page 106 containing the source file. In the process of rendering the source file the web server 102 may execute code in the source file which modifies the page rendered for the source file. Although the page 106 produced by the web server may include static HTML code from the source file, the source file may also contain code executed by the web server, which modifies the static HTML code or adds new HTML code. In short, there are differences between the page 106 that the web server serves to the web browser and the source file in the editor 100. Other differences may be produced by the web browser executing code in the page.

To enable graphic correlation between the source file displayed by the editor 100 and the page 106 displayed by the web browser, the web server 102 generates a page representation 108 when generating the page 106 that is sent to the web browser. The editor 100 receives the page representation 108. The editor 100 also begins to monitor the source code file to detect changes to the source code file. As discussed later, the monitoring may include generating logical snapshots of the source file that are amenable to comparison to the page representation 108. Each time the source file is modified, a new snapshot is taken, a difference between the new snapshot and a previous snapshot is found, and the page representation 108 is updated by applying the difference to the current page representation 108. The updated page representation 108 is used to generate DOM updates 110 that the editor applies to the browser's DOM of the page 106. The browser updates its graphic display of the DOM accordingly. The source file displayed by the editor and the page displayed by the browser are then in sync. In sum, the editor 100 is able to match up changes in the source code with the page 106 and update the page accordingly. The correlation can be applied in reverse, so that when the user interacts with the browser to modify or select parts of the displayed page, the system can locate the content in the source file to modify or select, e.g. when the user interacts with the browser to modify or select parts of the displayed page, the editor 100 can correspondingly update its view of the source file. In either case, the browser does not need to reload the page from the web server.

Figure 2:
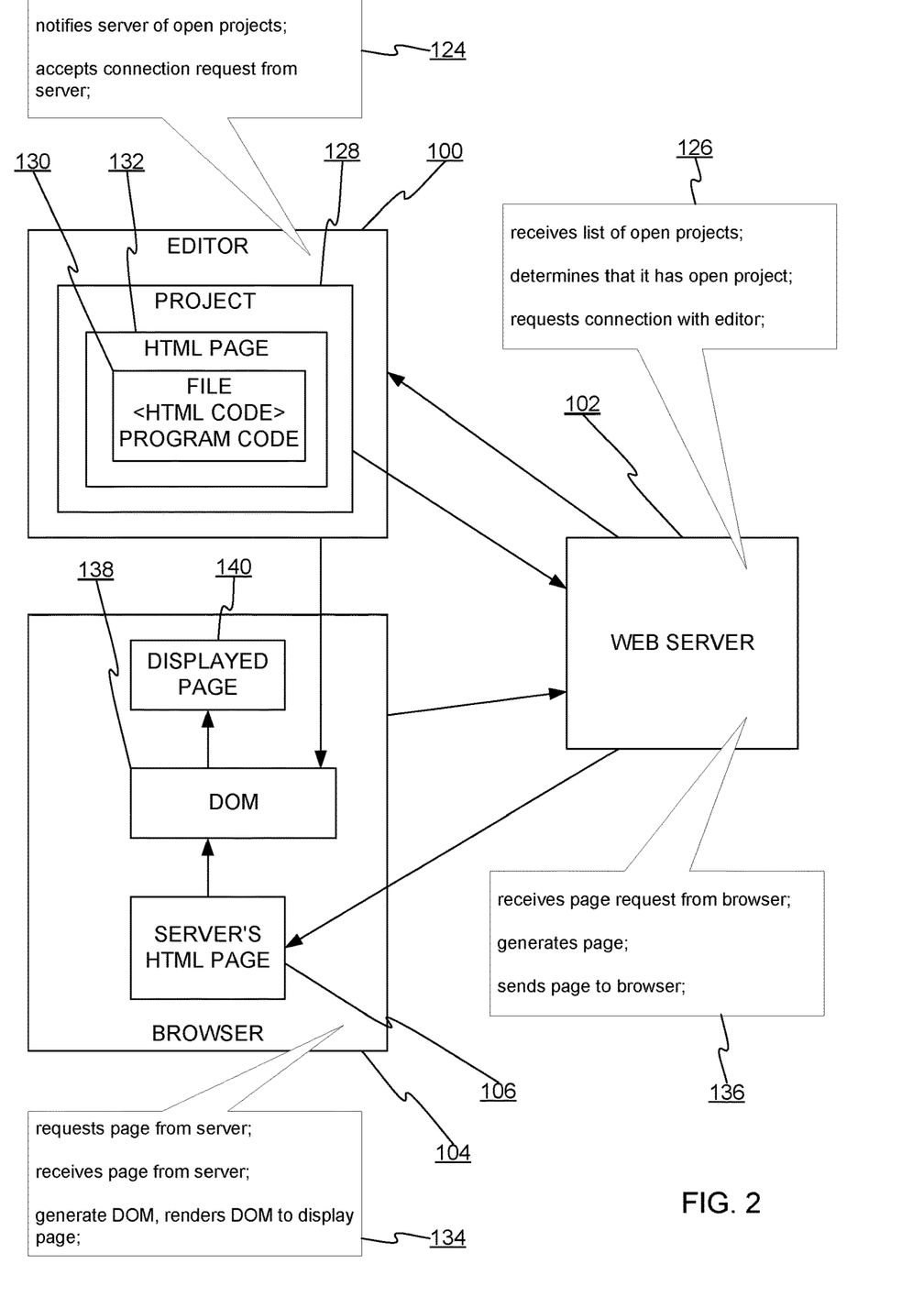
FIG. 2 shows how the editor begins correlating a source file with a displayed page.

FIG. 2 shows how the editor 100 begins correlating a source file 120 with a displayed page 122. The editor 100 may be part of an integrated development environment (IDE, not shown). While various steps will be described as being performed by the editor, the IDE (or IDE plugins) may perform some or all of the steps; the term "editor" as used herein also refers to an IDE and possible IDE plugins.

The editor 100 and web server 102 have a communication channel for direct exchange of data between the two components. Such a channel can be implemented using the Browser Link feature of Visual Studio™, published by Microsoft Corporation. The type of channel is not significant and other implementations may be used. The editor performs a process 124 of notifying the server, via an editor-server channel, of projects that are open in the editor. The web server performs a process 126 which includes steps such as receiving the list of open projects, determining that the server has access to an open project 128, and establishing a connection with the project. The project 128 includes an HTML source file 130, which may be part of an encompassing page/files 130, for instance style sheets, website templates, etc.

For discussion herein, the browser 104 is assumed to run on the same host (virtual or physical computer) as the editor 100. However, cloud-based tools may run on different hosts. As used herein "host" or "computing device" refers to one or more computers. The browser performs a process 134 of requesting the page 132 from the web server 102 (e.g. a hypertext transfer protocol (HTTP) message). The web server performs process 136 of receiving the page request, accessing the corresponding source file 130, generating a page, including executing any code on the source file 130 or performing other server-side transforms, for instance framework calls, and sends the page 106 to the browser. The browser receives the page, parses it to generate a DOM 138 for the page, and executes any scripts or other code in the page, which may in turn alter the DOM 138. The browser then displays a displayed page 140; a graphic window or application screen corresponding to the DOM. The browser may also implement an interface that enables the editor to issues calls into the DOM 138, as will be discussed below.

Figure 3:
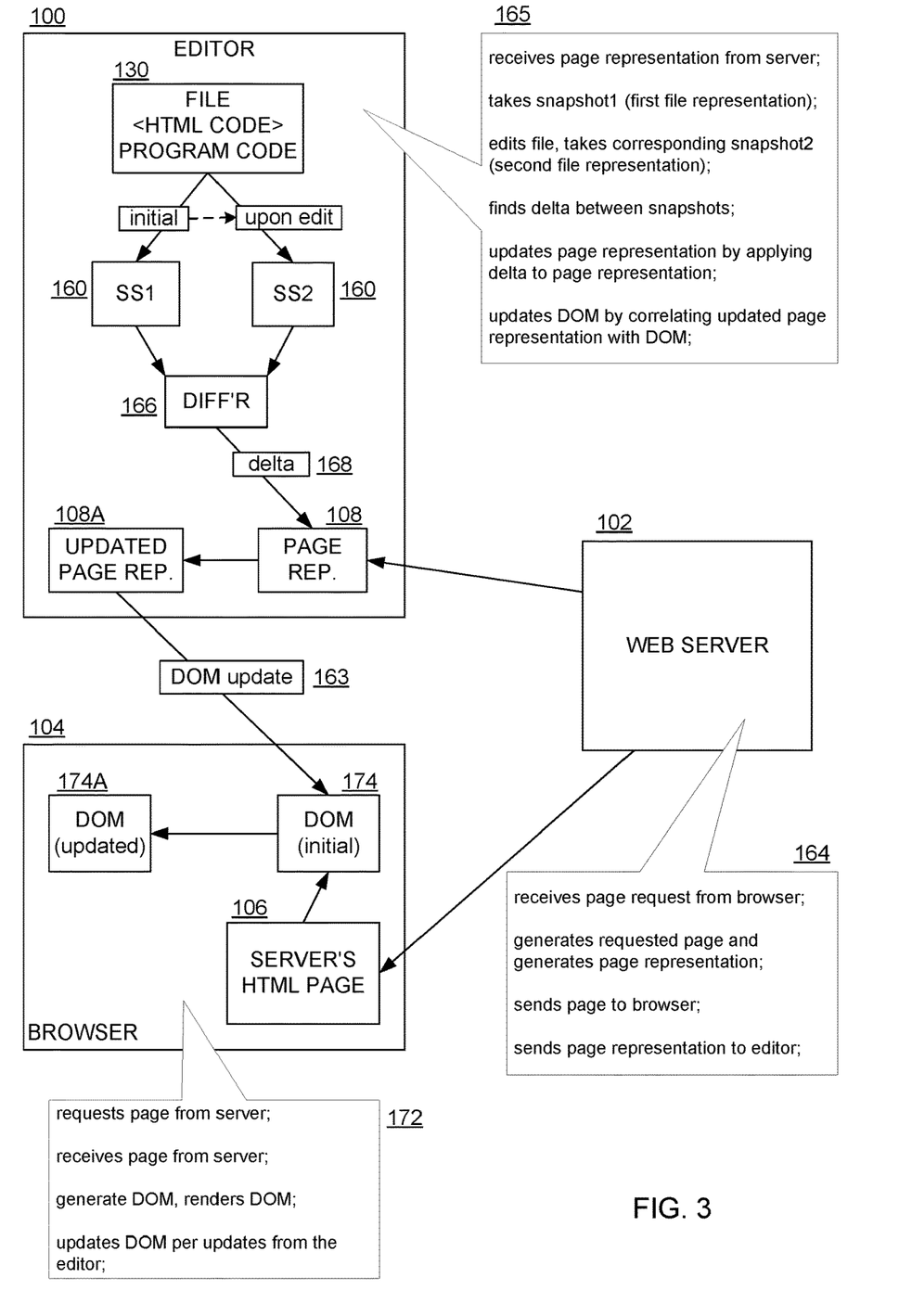
FIG. 3 shows how the editor captures snapshots of the source file and applies snapshot differences to a page representation from the web server to derive DOM updates.

FIG. 3 shows how the editor captures snapshots 160 of the source file 130 and applies snapshot differences 162 to the page representation from the web server to derive DOM updates 163. As discussed above, the web server 102 performs a process 164 of receiving a page request from the browser, generating the requested page, and returning it to the browser 104.

The web server also generates a page representation 108 that is sent to the editor 100. In other embodiments, the page representation is generated by something else, such as a JavaScript framework running in the browser (e.g. Angular or React). ASP.NET's Blazor platform is another example, which is not JavaScript but also runs in the browser. As discussed below, the page representation 108 may be a tree structure that mirrors the structure of the markup code generated by the web server when generating the page 106 provided to the browser 104. Nodes of the page representation 108 may structurally mirror, with some limits discussed below, tags of the page 106. For efficiency, not all of the information in the page 106 is included in the page representation 108; rather, the page representation 108 includes sufficient information to facilitate correlating content in the source file 130 with snapshot differences (discussed next) and with the DOM generated by the browser 104.

The editor's process 165 includes logic to take snapshots 160 of the structure of the source file 130 as it is being edited. A first snapshot 160 (SS1) is taken when the page representation 108 is received from the web server 102. Similar to the page representation 108, the snapshots reflect the tag structure of the source file 130, albeit the snapshots are derived from the source file, whereas the page representation 108 comes from the generation of the served page 106. A second snapshot 160 (SS2) is taken when a new edit of the source file is detected. If the editor has dynamic error checking, it may be preferable to take a second snapshot when the error checking indicates that the recent edit has not created an error. This approach may prevent snapshots from being taken while tags and literals are being typed in, for instance.

The editor is also provided with a differencing module 166. The differencing module 166 finds the difference between the most recent snapshot 160 (e.g., SS2) and the previous snapshot 160 (e.g., SS1). The differencing module 166 may be implemented with any known differencing algorithm. In one embodiment, the snapshots are text serializations of tree structures (with nodes corresponding to source code tags/elements), and the differencing algorithm is a stock text-differencing algorithm. The differencing module 166 finds a difference 168 between the two most recent snapshots. In one embodiment the difference 168 is a sub-tree extracted from one of the snapshots with an indication of whether the change is an addition or a subtraction.

The editor then employs various heuristics (discussed below) to correlate the difference 168 with the page representation 108. That is, the editor determines where the change in the source file, in the form of the difference 168, correlates with the rendered page 106, in the form of the page representation 108. The page representation is updated to form an updated page representation 108A. The change in the page representation allows the editor to generate a DOM update 163 that can be applied by calling into a DOM interface exposed by the browser 104. As part of the process 172 performed by the browser, the browser receives the DOM update 163, updates the initial DOM 174 (corresponding to the initial page representation 108) and to form an updated DOM 174A, which is rendered as graphics and displayed by the browser as the displayed page 140.

Figure 4:
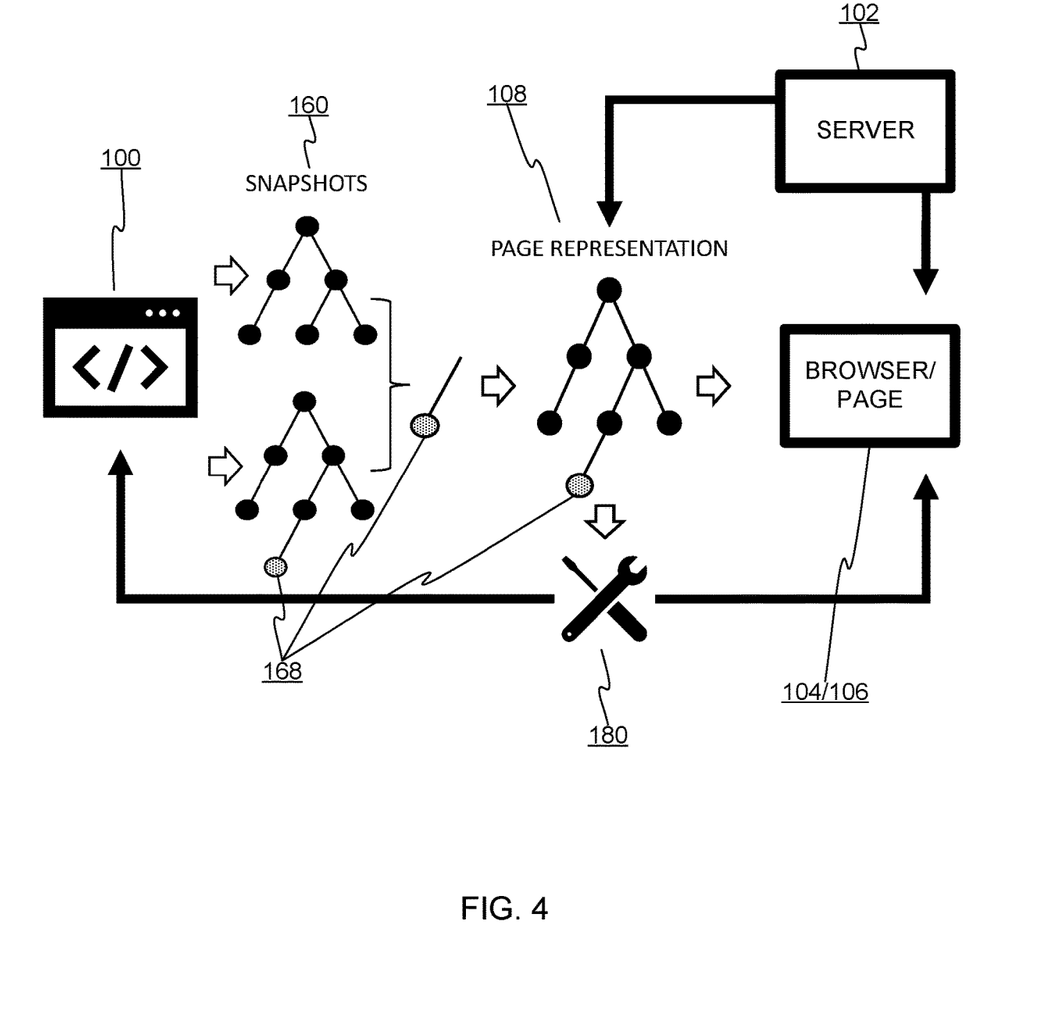
FIG. 4 shows details of snapshots and the page representation.

FIG. 4 shows details of snapshots 160 and the page representation 108. As discussed above, the snapshots 160 may be text objects containing tree structured content (discussed further below). When two snapshots 160 are compared, a difference 168 is found and applied to the page representation 108, which in turn is applied to the page in the browser via DOM updates called through a channel 180 between the editor 100 and the browser 104. The snapshots 160 are compared to find incremental changes to the source file, which can be applied to the page representation (a logical tree) and then to the browser. These changes will occur around any live data that was originally rendered by the browser, so that the user gets a preview of what the changes will look like without requiring the server to rebuild the page. Taking snapshots at fine granularity (frequently) will minimize differences and aid the correlating heuristics.

The page representation can be mapped to the page's DOM in straightforward way. For the most part that is a one-to-one mapping, that is, e.g. we see some attribute changed on some tag in the page representation, that tag may map directly to something in the DOM, and the corresponding attribute in the DOM is changed, for instance. Nonetheless, in many implementations there may be some things in the page representation that won't exist in the browser DOM, which may complicate an update. Once as many nodes in the tree as possible have been matched up, detecting changes at that point involves walking over one of the trees and, for example: finding a node that did not have a match in the other tree, so it must be inserted; finding a node that did not have a match in the opposite direction, so it must be removed; finding a new attribute of a node, so changing the corresponding attribute in the other tree, etc.

There may be cases where the difference to be applied involves inserting something into the DOM next to things that don't actually exist. For example, a web form may have a user control, which is like a small partial page that can be placed where needed and reused in different places. If a new user control is added in the editor and it doesn't contain anything, then that doesn't actually exist anywhere in the DOM, because it hasn't been rendered by the server. So when adding something such as a new control in the source file it nonetheless must be added to the DOM. A marker can be added to the page representation that indicates the presence of a user control with no children. If children are added to the control it gets complicated because those need to be inserted as nodes in the DOM, but the thing (node for the control) that needs to be inserted into does not exist in the DOM. What is around the control can be used as clues that indicate where to put things new children. That is, contextual clues can be matched up to find the right location.

Regarding a snapshot tree, a snapshot corresponds to one source file, whereas the logical tree in the page representation contains the total content of the entire page, which can be composed of many files. The snapshot may contain preview content for things that need to be rendered on the server, which may not exactly match the logical tree in the page representation. However, it is desirable to have the snapshot tree and logical tree to be as consistent as possible.

The approach discussed above is beneficial in itself to push changes from the source code to the browser, but also it is also beneficial in that it provides a platform that leverages one set of tools that allow reliable synchronization regardless of how the page is rendered. Building tools in the browser for all possible means of content generation can be difficult, because the user makes a change in the browser, say selecting something and deleting it, it is preferable to see that change happen in the source file. A delete tool that removes the thing from the browser and in the source code can be built, but then every feature and tool that is built in the browser then has to do two things consistently. Moreover, deleting things in a loop is complicated, because all of the instances of that thing that came from the loop now have to be deleted, so the delete tool has to be able to understand things in the DOM that have been repeated. Using the update process described, the tools discussed above only need to know how to change the source code; source code changes will propagate through the system and the user will see them accurately, taking into account everything that can happen so repeating regions and other complications that might affect rendering of the page can be handled by merely letting changes propagate from the source file onward to the browser. Since the usual flow of source code is to get built into the page, the flow is built to simulate that is almost identical to the main process. Thus it is not difficult to create plugins for any kind of a web development framework.

Figure 5:
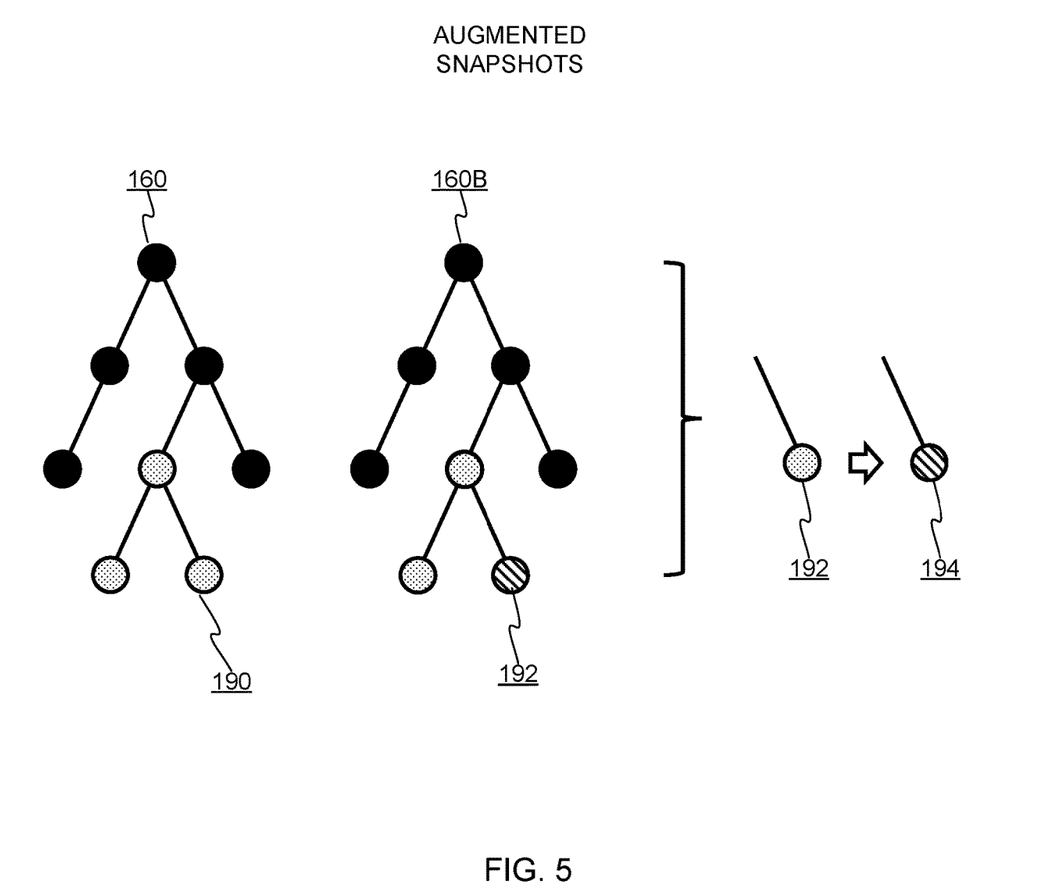
FIG. 5 shows an augmented source file snapshot.

FIG. 5 shows an augmented source file snapshot 160B. In some embodiments there may be augmentations that can be made to snapshots to get them closer to what is in the browser or to add previews of new code. For instance, with web forms there are tags that are added to the source file that represent web form controls. Controls and constructs of those nature eventually generate HTML, but they are not themselves HTML code. When added to the source file they are some other kinds of tag/things that are not understood by the browser, e.g. a calendar control. The browser would not know what to do with a calendar control so the editor cannot push it directly to the browser. But, a corresponding snapshot can be changed so that the initial snapshot has representation of that calendar control in it. There may be a pass (left side of FIG. 5) over the snapshot that goes over the snapshot 160 and recognizes a calendar control 190 and replace it with some sample HTML code 192. The sample HTML code 192 may not match exactly what is in the browser, but as long as the calendar control itself is not changing then the calendar in the browser will be left alone, and when the calendar control is changed a sample of what the calendar will look like will be displayed by the browser, although the entire control will not get replaced. In general snapshots can be augmented to align the browser view with the source file, that is, a wysiwyg view in the browser can be maintained. If changes to the control cannot be handled a browser refresh can be resorted to.

The right side of FIG. 5 shows corresponding augmentations being made to the logical tree in the page representation 108. The sample HTML code 192 is added to the page representation and possibly changed to a corresponding DOM node 194. Generally it is desirable to try to massage the logical tree in the page representation to make it look more like the snapshots it is initially received from the server, and similar operations may be performed to the snapshots to make them look more like the logical tree each time a snapshot is taken. This brings the DOM and the source code closer together from both directions.

Figure 6:
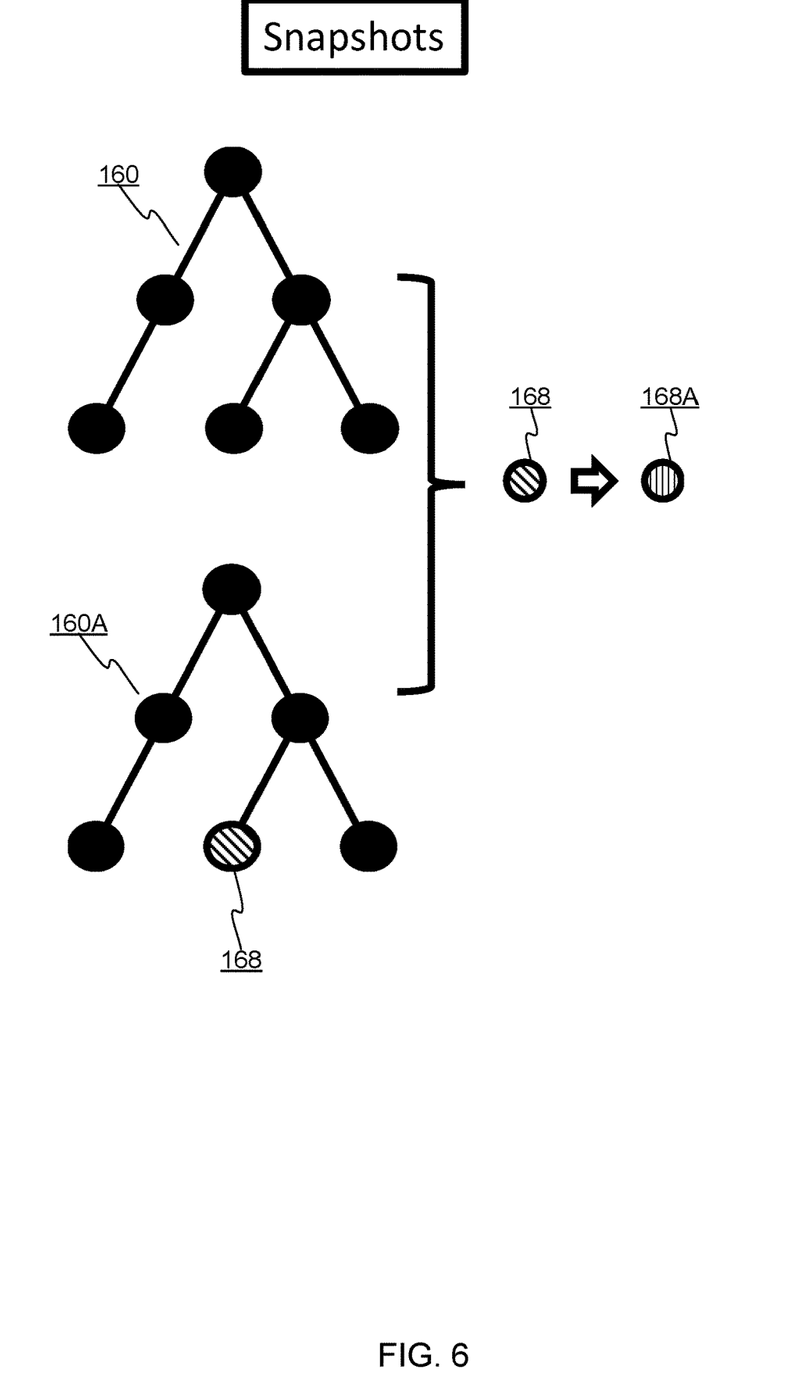
FIG. 6 shows an initial snapshot 160 and a next snapshot.
Figure 7:
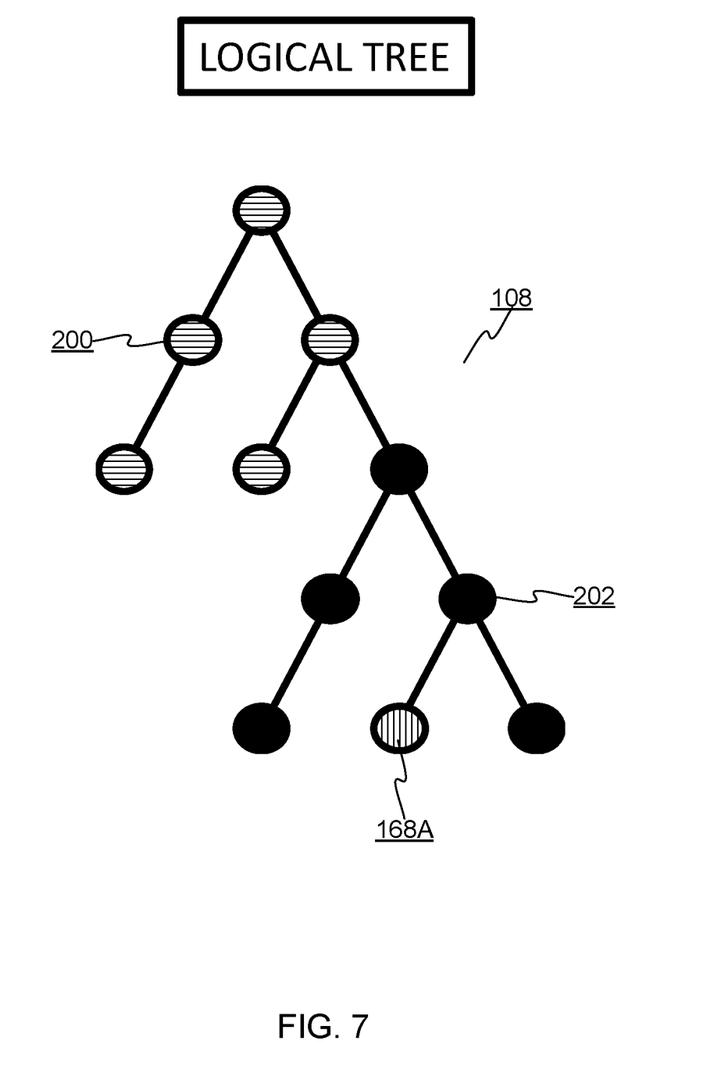
FIG. 7 shows how the page representation's logical tree can differ from snapshots.
Figure 8:
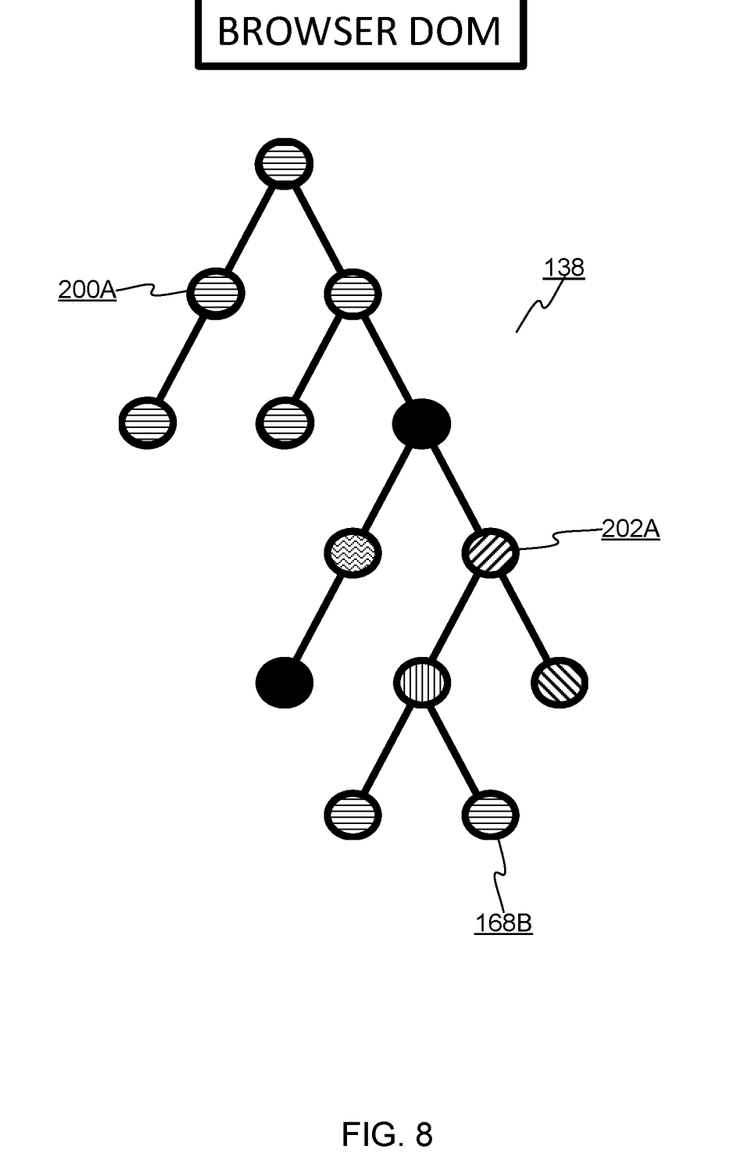
FIG. 8 shows the DOM corresponding to the logical tree in FIG. 7.

FIGS. 6-8 shows details of mapping snapshots to a logical tree. FIG. 6 shows an initial snapshot 160 and a next snapshot 160A. A difference 168 is found between the snapshots, e.g. a renamed tag, a change to tag properties, etc. The difference 168A is modified as needed to more closely match the logical tree of the page representation. FIG. 7 shows how the page representation's logical tree can differ from snapshots. As noted above, the snapshots are taken from one source file at a time, but the page represented by the logical tree may be made up of multiple source files. For example, the logical tree might have a first portion 200 corresponding to a site-wide master page and second portion 202 corresponding to a page-specific content page (the source file). A modified node 168A is changed per the difference 168. The content in the browser's DOM 108 might be even more different than the logical tree, as JavaScript might have modified some values or other transforms may have been applied by the browser. Because differences are computed incrementally, the updates can be pushed to the browser even when other things have changed around it, as depicted in FIG. 8. FIG. 8 shows the DOM corresponding to the logical tree in FIG. 7. A first DOM portion 200A may correspond to the first portion 200 of the logical tree. A second DOM portion 202A may also differ in structure and properties from the corresponding second portion 202 of the logical tree.

Figure 9:
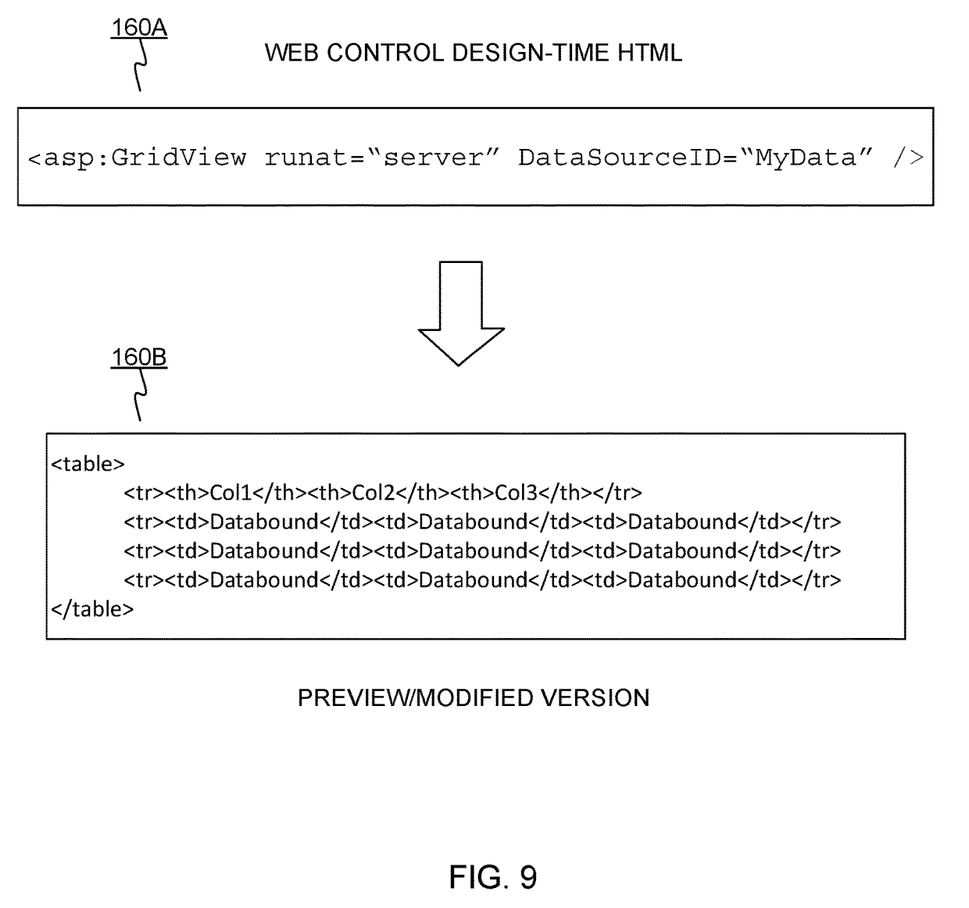
FIG. 9 shows an example of a modified snapshot.

FIG. 9 shows example text representations of an original snapshot 160A and a modified snapshot 160B. In ASP.NET WebForms, web controls provide "Design-Time HTML" which is a preview version of what the control will render at runtime. The web control markup (the asp element in snapshot 160A) cannot be pushed to the browser, but modifying the snapshot 160A to the preview version (the table element in modified snapshot 160B) allows the snapshot to be mapped to what exists in the browser and used for incremental updates to the live rendering of the GridView control that came from the server.

The same approach can be used with server-side code in the source file. ASP.NET's Razor language, for example, is code-heavy and does not lend itself well to a designer. However, with the snapshotting design, snapshots can be updated to remove code and replace it with preview values or simulated execution of code structures. If the simulations or preview values are generated consistently, and the code does not change, then the live content that was originally rendered by the server will be unchanged, because there will be no difference in the snapshots. However, if new code is added or code is changed in a way that the previews can adapt to, then the preview content will be pushed to the browser. Consider several Razor examples. Strongly-typed expressions can be recognized and a sample value (e.g. DateTime) may be generated: @employee.StartDate=>3/12/2020 10:43:27 AM. Certain static methods can be recognized and can be run on sample values, e.g. DateTime.ToString:@employee.StartDate.ToString("MM/dd/yy")=>03/12/20. Known HTML helpers can be recognized and previews generated, e.g.: @Html.ActionLink("Click Here", "DoSomething")=><a href="DoSomething">Click Here</a>. Various code structures can also be augmented. For example @for, @while, @foreach can be modified to repeat the loop-contained content a fixed number of times. The @if construct can be assumed to be true. Although these simple ways to simulate execution are sufficient for design-time purposes, more complicated mappings can be readily implemented using the same concepts. Plug-in modifiers can be added to the editor to simulate running JavaScript to make DOM-like changes to snapshots. Plug-ins can also be used for web frameworks such as React and Angular. The editor may implement a plug-in interface revolving around snapshot changes. A call may provide a snapshot, the plug-in makes whatever are needed, and returns the snapshot when finished. A similar interface can be used for page representations.

Regarding JavaScript, changes may be DOM-like in that an augmentation estimates what a DOM should do. The execution of JavaScript could be simulated to run against the snapshot tree. The existing analysis trees that a JavaScript editor already has may be a convenient way to understand what the JavaScript does; the tree can be stepped over that and those changes can be applied in approximate fashion. Any simulation mechanism can be used. However, because the snapshots are working against just one source file, which may be just one part of the relevant page, and because the JavaScript might be changing things in the page that are not in that source file, this would cause problems for an actual JavaScript engine running. However, an analysis tree can be walked through to see what parts of the page would have been changed. Everything that would fail can be ignored, but whatever succeeds can be simulated against a snapshot tree instead of against the browser DOM. As long as the JavaScript executes the same way for snapshot 1 and snapshot 2 then there will be no differences and no effect. The JavaScript can be changed and then it will execute differently on the next snapshot, and then differences between the snapshots can be detected and pushed across to the browser's DOM.

Figure 10:
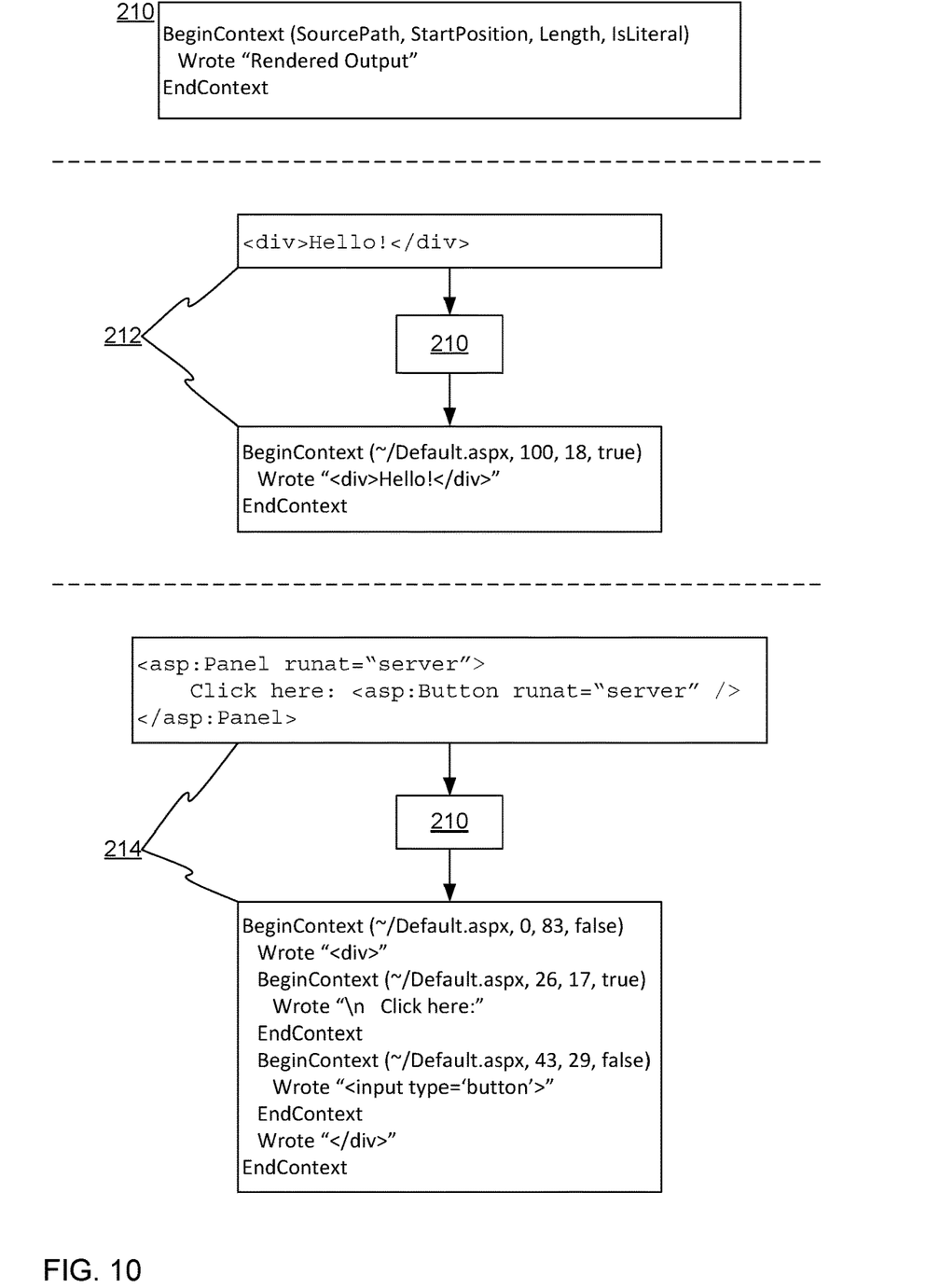
FIG. 10 shows an example of mapping data, or a page representation, generated by the web server.

FIG. 10 shows an example of a mapping data function 210, and examples 212, 214 of page representations, or mapping data, generated by the web server using the mapping data function 210. As noted above, the server, when rendering a page for the browser, records a page representation for the editor. The page representation, or mapping data, may be a series of contexts that are recognized and recorded when building the page, and generally corresponding to HTML elements/tags of the page. Using the mapping data function 210, each context has a header indicating the path of the source file, a start position of the context (a file offset), a length, and a flag for indicating literal context, followed by the content of the context.

A literal context is used to help reduce the exchange of static content and keep the mapping data focused on dynamic content that is opaque to the editor. When many server side technologies run, they do not render each individual tag separately (if there is a web control it might be rendered by itself). But if a blob of HTML is encountered then all the server may need to do is copy the HTML blob from the source file and send it right to the browser. Individual mapping data for each tag in that case is not needed. Instead, a context with the literal flag set to true indicates that an HTML blob was rendered and was sent verbatim to the browser. The literal context indicates where each of those tags came from, so if it is known that it was copied exactly (literally) then character by character mapping can be performed by the editor (using offsets within those two ranges to figure out where things are).

Referring to example 210 in FIG. 10, the server records "BeginContext" (with the shown parameters) when a part of a source file with the div tag begins being rendered, and "EndContext" when the closing element for that tag in the source file is done. In between, the server reports what content was rendered, in this case, literal content.

Referring to example 212 in FIG. 10, the panel has its own context that allows it to be mapped. The context in this example would be, when the panel starts rendering the context, the entire range from the begin tag of the panel to the end tag. Then the panel itself writes out a div start tag, and then the panel starts processing its children. The words "click here" and the other control have their own contexts, and because of that the button control can be mapped specifically to the "h" in 'click here' (because it is a literal), but the divs (the begin and end tags of the panel rendered) cannot be mapped to anything more specific, so the entire div range is mapped out. These nested contexts are important because they make it easier for the server to tell the browser about the page, because there is no concern for ending the panel before it starts working on the children and then starting the panel back up again. In this way, the system is able to handle nesting complexity, for instance with with web controls and page construction (things in a content page may be nested within a master page).

In summary, a development system can be constructed that keeps track of correlation between the source file and the rendered page. Structures and heuristics are used by the editor to bridge the gap between the editor and the browser.

Changes and interactions can flow between the browser and editor despite server-side (and perhaps browser-side) actions that are opaque to the editor. Snapshots can be augmented to enable the correlation logic to flow through accurately to the browser's page/DOM.

Figure 11:
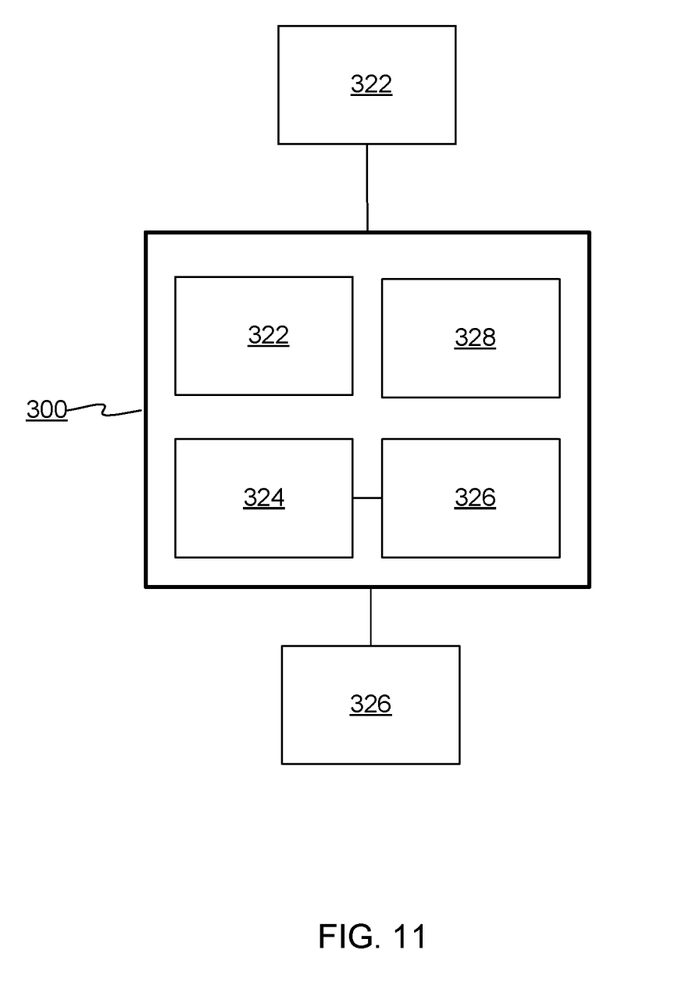
FIG. 11 shows details of a computing device.

FIG. 11 shows details of a computing device 300 that may serve as a host executing the components discussed above. The technical disclosures herein will suffice for programmers to write software, and/or configure reconfigurable processing hardware (e.g., field-programmable gate arrays (FPGAs)), and/or design application-specific integrated circuits (ASICs), etc., to run on the computing device 300 to implement any of the features or embodiments described herein.

The computing device 300 may have one or more displays 322, a network interface 324 (or several), as well as storage hardware 326 and processing hardware 328, which may be a combination of any one or more: central processing units, graphics processing units, analog-to-digital converters, bus chips, FPGAs, ASICs, Application-specific Standard Products (ASSPs), or Complex Programmable Logic Devices (CPLDs), etc. The storage hardware 326 may be any combination of magnetic storage, static memory, volatile memory, non-volatile memory, optically or magnetically readable matter, etc. The meaning of the term "storage", as used herein does not refer to signals or energy per se, but rather refers to physical apparatuses and states of matter. The hardware elements of the computing device 300 may cooperate in ways well understood in the art of machine computing. In addition, input devices may be integrated with or in communication with the computing device 300. The computing device 300 may have any form-factor or may be used in any type of encompassing device. The computing device 300 may be in the form of a handheld device such as a smartphone, a tablet computer, a gaming device, a server, a rack-mounted or backplaned computer-on-a-board, a system-on-a-chip, or others.

Embodiments and features discussed above can be realized in the form of information stored in volatile or non-volatile computer or device readable storage hardware. This is deemed to include at least hardware such as optical storage (e.g., compact-disk read-only memory (CD-ROM)), magnetic media, flash read-only memory (ROM), or any means of storing digital information in to be readily available for the processing hardware 328. The stored information can be in the form of machine executable instructions (e.g., compiled executable binary code), source code, bytecode, or any other information that can be used to enable or configure computing devices to perform the various embodiments discussed above. This is also considered to include at least volatile memory such as random-access memory (RAM) and/or virtual memory storing information such as central processing unit (CPU) instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on.

Embodiments and features discussed above can be realized in the form of information stored in volatile or non-volatile computer or device readable media. This is deemed to include at least media such as optical storage (e.g., compact-disk read-only memory (CD-ROM)), magnetic media, flash read-only memory (ROM), or any current or future means of storing digital information. The stored information can be in the form of machine executable instructions (e.g., compiled executable binary code), source code, bytecode, or any other information that can be used to enable or configure computing devices to perform the various embodiments discussed above. This is also deemed to include at least volatile memory such as random-access memory (RAM) and/or virtual memory storing information such as central processing unit (CPU) instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on.

The invention claimed is:

1. A method performed by a computing device comprising processing hardware, storage hardware, and a display, the process comprising:
loading, by a hypertext markup language (HTML) editor, a source file, and displaying the source file for editing;
receiving, from a web server, a page representation generated by the web server when serving an HTML page corresponding to the source file;
receiving, by a browser executing on the computing device, the HTML page from the web server, and in response: generating a document object model (DOM) and displaying a view of the HTML page according to the DOM;
taking snapshots, by the HTML editor, of the source file, in correspondence with edits to the source file;
finding, by the HTML editor, a difference between a first snapshot and a second snapshot; and
updating, by the HTML editor, the DOM, wherein the DOM is updated based on the page representation and based on the difference between the first snapshot and the second snapshot.

2. A method according to claim 1, wherein the updating comprises matching the difference to a portion of the page representation, and mapping the portion of the page representation to a portion of the DOM.

3. A method according to claim 1, further comprising augmenting a snapshot by parsing non-HTML code in the source file, and correlating the page representation with the augmented snapshot.

4. A method according to claim 3, further comprising adding augmented content in the snapshot to the DOM via the page representation.

5. A method according to claim 1, wherein the HTML editor is configured with an interface through which HTML editor plug-ins can interface with the snapshots.

6. A method according to claim 5, wherein a plug-in receives a snapshot, modifies the snapshot, and returns the snapshot to the HTML editor.

7. A method according to claim 1, wherein DOM is incrementally updated by the HTML editor finding respective differences between snapshots.

8. A method according to claim 7, wherein the differences are applied to the DOM via a communication channel between the HTML editor and the browser, whereby the view of the HTML page displayed by the browser maintains visual consistency with the editing of the source file.

9. A computing device comprising:
processing hardware;
storage hardware storing instructions configured to, when executed by the processing hardware, perform a process comprising:
executing an HTML editor, a web server, and a web browser;

maintaining, by the HTML editor, a page representation that correlates with an HTML page provided to the browser by the web server and displayed by the browser, the HTML page comprising content provided by a source file open for editing in the HTML editor;

capturing, by the editor, a first snapshot of the HTML file that corresponds to a first state of the page representation, the first state of the page representation corresponding to the HTML page as initially provided to the browser by the web server, the first state of the page representation corresponding to a first state of the source file in the editor, wherein the browser maintains a DOM of the html page, the DOM having a first state corresponding to the HTML page as initially provided by the web browser;

capturing, by the editor, a second snapshot of the HTML file based on an edit of the source file, and based on capturing the second snapshot: finding a difference between the first snapshot and the second snapshot; and based on the difference, updating the page representation to a second state, and based on the second state of the page representation, updating the DOM to a second state, wherein the browser displays a rendering of the DOM in the second state.

10. A computing device according to claim 9, wherein the difference is found by comparing portions of the snapshots that correspond to tags in the source file.

11. A computing device according to claim 9, wherein the HTML page generated by the server is displayed by the browser generating the DOM therefrom, wherein the HTML page comprises a portion of HTML content generated by the web server executing non-HTML code in the source file, and wherein edits in the source file alter the portion of HTML content in the browser without the browser refreshing the HTML page.

12. A computing device according to claim 9, wherein the updating the page representation to the second state comprises matching a portion of the second snapshot with a corresponding portion of the page representation.

13. A computing device according to claim 12, wherein the matching the portion of the second snapshot with the corresponding portion of the page representation comprises matching tags respectively therein.

14. A computing device according to claim 9, wherein the process further comprises the HTML editor mapping a portion of non-HTML code in the source file to a portion of sample HTML code and inserting the sample HTML code into the DOM.

15. A computing device according to claim 9, wherein the difference corresponds to a node in the DOM and the node in the DOM is updated according to the difference.

16. Storage hardware storing instructions that, when executed by a computing device, perform a process comprising:

executing an HTML editor, a web browser, and a web server;

editing an HTML file in the HTML editor, the HTML file including a portion of non-HTML code;

serving a web page to the web browser by the web server generating a portion of HTML code based on the portion of non-HTML code in the HTML file, wherein the web server generates a page representation of the web page that includes representation of the portion of HTML code generated based on the portion of non-HTML code in the HTML file, the web server providing the page representation to the editor;

receiving and rendering the generated web page by the web browser; and detecting, by the editor, an edit to the HTML file, and based on the edit and the page representation, the editor causing the web browser to re-render a portion of the web page without refreshing the web page from the web server.

17. Storage hardware according to claim 16, wherein the editor causes the web browser to re-render the portion of the web page by correlating the edit with the page representation.

18. Storage hardware according to claim 17, wherein the edit is detected by taking snapshots of the HTML file, finding a difference between the snapshots, and matching the difference with a portion of the page representation that corresponds to the re-rendered portion of the web page.

19. Storage hardware according to claim 18, the process further comprising updating the page representation according to the difference.

20. Storage hardware according to claim 18, the process further comprising augmenting a snapshot according to a second portion of non-HTML code in the HTML file, and updating a DOM in the browser according to the augmented snapshot.

* * * * *